(12) United States Patent
Hashimoto et al.

(10) Patent No.: US 8,435,485 B2
(45) Date of Patent: May 7, 2013

(54) METHOD FOR PRODUCING ZINC OXIDE USING AMMONIUM BROMIDE, EXOERGIC FILLER, RESIN COMPOSITION, EXOERGIC GREASE AND EXOERGIC COATING COMPOSITION COMPRISING THE ZINC OXIDE

(75) Inventors: Mitsuo Hashimoto, Fukushima (JP); Hiroshi Hakozaki, Fukushima (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 501 days.

(21) Appl. No.: 12/482,241

(22) Filed: Jun. 10, 2009

(65) Prior Publication Data
US 2010/0104871 A1 Apr. 29, 2010

(30) Foreign Application Priority Data
Oct. 28, 2008 (JP) ................... 2008-276388

(51) Int. Cl.
*C01G 9/02* (2006.01)
*C01G 9/03* (2006.01)

(52) U.S. Cl.
USPC ......................... 423/622; 428/402

(58) Field of Classification Search ............... 428/402
See application file for complete search history.

(56) References Cited

U.S. PATENT DOCUMENTS

| | | | |
|---|---|---|---|
| 3,617,358 A * | 11/1971 | Dittrich | 427/447 |
| 5,211,990 A * | 5/1993 | McKinney et al. | 427/447 |
| 5,736,111 A | 4/1998 | Saegusa | |
| 5,840,267 A * | 11/1998 | Saegusa | 423/594.9 |
| 5,855,862 A * | 1/1999 | Grenier et al. | 423/594.13 |
| 6,114,429 A | 9/2000 | Yamada et al. | |
| 6,303,091 B1 * | 10/2001 | Mohri et al. | 423/263 |
| 6,696,029 B1 * | 2/2004 | Myerson et al. | 423/101 |
| 6,783,744 B2 * | 8/2004 | Myerson et al. | 423/101 |
| 2003/0008961 A1 | 1/2003 | Uematsu | |
| 2004/0219087 A1 * | 11/2004 | Mohri et al. | 423/263 |
| 2007/0293624 A1 | 12/2007 | Matsumoto et al. | |

FOREIGN PATENT DOCUMENTS

| | | |
|---|---|---|
| EP | 0 666 238 A1 * | 8/1995 |
| JP | 09-020504 A | 1/1997 |
| JP | 09-048618 A | 2/1997 |
| JP | 11-049958 A | 2/1999 |
| JP | 11246885 A | 9/1999 |
| JP | 2007070492 A | 3/2007 |
| JP | 2008-230915 A | 10/2008 |
| JP | 2008-266445 A | 11/2008 |

OTHER PUBLICATIONS

Kelleher & Hashmi, The effect of vibratory milling on the powder properties of zinc oxide varistors, J. of Mat. Processing Technology, 201 (2008) 645-650.*
English language Search Report and Written Opinion issued in counterpart International Application No. PCT/JP2009/005445, (2009).

* cited by examiner

*Primary Examiner* — Hoa (Holly) Le
(74) *Attorney, Agent, or Firm* — Novak Druce Connolly Bove + Quigg LLP

(57) ABSTRACT

The present disclosure provides a zinc oxide particle that can be used more suitably than common zinc oxide in the application such as an exoergic filler and the like, and can be used in the other applications. A zinc oxide particle having a median size of 1 to 30 μm and D90/D10 of 4 or less is provided.

10 Claims, 1 Drawing Sheet

METHOD FOR PRODUCING ZINC OXIDE USING AMMONIUM BROMIDE, EXOERGIC FILLER, RESIN COMPOSITION, EXOERGIC GREASE AND EXOERGIC COATING COMPOSITION COMPRISING THE ZINC OXIDE

CROSS REFERENCE TO RELATED APPLICATIONS

This non-provisional application claims priority under 35 U.S.C. §119(a) on Patent Application No. 2008276388 filed in Japan on Oct. 28, 2008, the entire contents of which are hereby incorporated by reference.

TECHNICAL FIELD

The present disclosure relates to a zinc oxide particle, a method for producing it, an exoergic filler, a resin composition, an exoergic grease and an exoergic coating composition.

BACKGROUND OF THE DISCLOSURE

Zinc oxide is widely used in the various industrial fields such as rubber accelerators, pigments for coating compositions and inks, such electronic components as ferrite and varistor, medicinal products and cosmetics. As one of various applications of this zinc oxide, an exoergic filler has been proposed (see Japanese Kokai Publication 2008-19426, Japanese Kokai Publication Heill-246885, Japanese Kokai Publication 2007-70492, Japanese Kokai Publication 2002-201483).

However, alumina and aluminum nitride are usually used widely as the exoergic filler. Therefore, zinc oxide is hardly put into actual utilization compared to these compounds.

However, alumina has a problem that kneading machines become extremely worn in the production process of exoergic sheets and so on, because the Mohs hardness of alumina is high. Further, it is difficult to add aluminum nitride to a resin in high concentration, because of poor filling property. In addition, aluminum nitride is expensive, so exoergic parts made thereof are expensive. Therefore, new exoergic fillers which are made of other materials than such conventional materials are needed.

Zinc oxide has almost intermediate thermal conductivity between alumina and aluminum nitride and is suitable for use as an exoergic filler. However, zinc oxides which are widely used industrially are fine particles having particle diameter of not greater than 1 μm. Such zinc oxide fine particles are hardly used because the heat resistance between particles is high and exoergic property is insufficient.

On the other hand, in the field of electronic components, a thin film layer formed using exoergic filler containing-liquid products such as exoergic greases and resin compositions, for example, coating compositions. There is a problem that the thin film layer cannot be obtained when coarse particles are contained in the exoergic filter. Coarse particles having a particle diameter of 50 μm or more must not be contained in the exoergic filler to employ the filler in the exoergic grease. Zinc oxide of which particle size distribution is kept under control is unknown to the public.

On the other hand, the method of designing particle size distribution to enable the closest packing by combining two or more fillers of various particle size, in order to achieve better thermal conductivity has been suggested (see Japanese Kokai Publication 2002-201483). Therefore, zinc oxide particle showing sharp particle size distribution and having large particle diameter is required. The method of baking with the use of flux is known for increasing the particle diameter of inorganic compounds. However, the zinc oxide particles obtained by the above mentioned method show broad particle size distribution and cause a problem that coarse particles produced in the baking are mixed into the desired products.

DISCLOSURE OF INVENTION

Object of the Disclosure

It is desired that a new effect, which results from physical properties different from common ones, can be achieved by using the zinc oxide particles having large particle diameter and showing specific particle size distribution in the above-mentioned various applications of zinc oxide other than the exoergic filler.

The object of the present disclosure is to provide zinc oxide particle that can be used more suitably than common zinc oxide in the application such as an exoergic filler and the like.
Problem to be Solved by the Invention The present disclosure relates to a zinc oxide particle having a median size of 1 to 30 μm and D90/D10 of 4 or less.

The zinc oxide particle is preferably obtained by baking a source of the zinc oxide particle in the presence of ammonium bromide.

The zinc oxide particle is preferably obtained by mixing the source of the zinc oxide particle and 0.1 to 10 weight % of ammonium bromide relative to the source of the zinc oxide particle, and static baking the mixture at 600 to 1200° C.

The present disclosure relates to a method for producing a zinc oxide particle, comprising baking a source of the zinc oxide particle in the presence of ammonium bromide to obtain the zinc oxide particle.

It is preferred that ammonium bromide is added in the proportion of 0.1 to 10 weight % relative to the source of the zinc oxide particle and the baking is performed by static baking at 600 to 1200° C.

The present disclosure also relates to an exoergic filler comprising the zinc oxide particle.

The present disclosure also relates to a resin composition comprising the zinc oxide particle.

The present disclosure also relates to an exoergic grease comprising the zinc oxide particle.

The present disclosure also relates to an exoergic coating composition comprising the zinc oxide particle.
Effect of the Invention The zinc oxide particle of the present disclosure can be used suitably as the exoergic filler for various exoergic parts, such as exoergic sheets and exoergic greases even though it is of a large particle, because the mixing of coarse particles having particle diameter of 50 μm or more has almost never happened and the particle size distribution thereof is sharp. Furthermore, the zinc oxide particle can be used in the fields of rubber accelerators, pigments for coating compositions and inks, such electronic components as ferrite and varistor, medicinal products and cosmetics such as foundation and sunscreen.

DETAILED DESCRIPTION OF PREFERRED EMBODIMENTS

Figure 1:
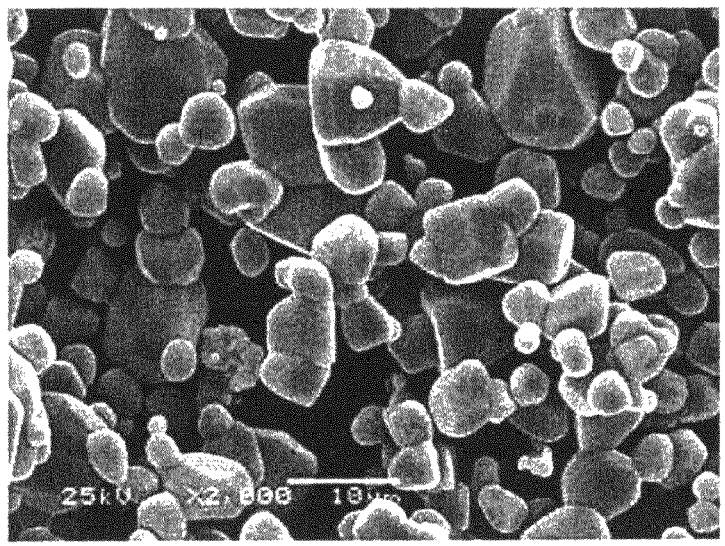
FIG. 1 is a scanning electron microscope photograph of zinc oxide particles of the present disclosure obtained in Example 1.
Figure 2:
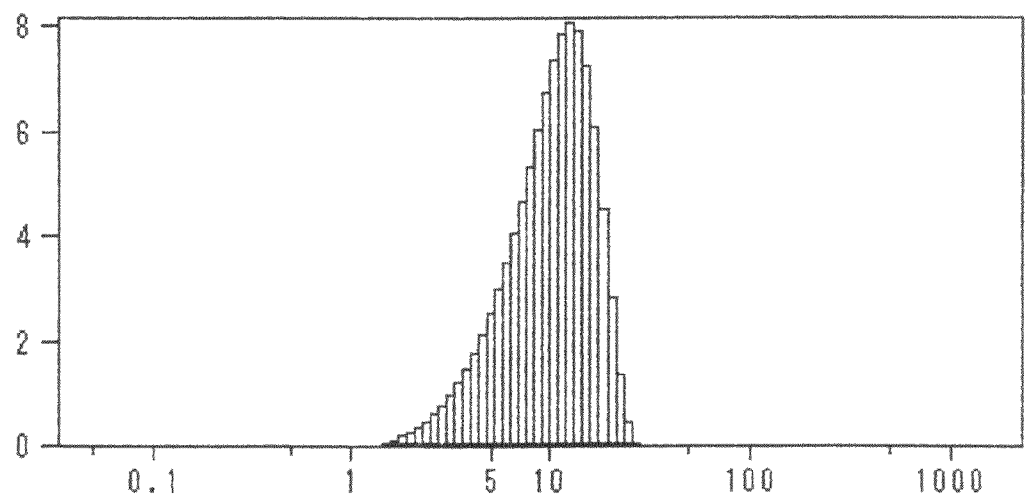
FIG. 2 shows particle size distribution of zinc oxide particles of the present disclosure obtained in Example 1.

The present disclosure is described in more detail below.

The zinc oxide particle of the present disclosure has a median size of 1 to 30 μm and D90/D10 of 4 or less. That is, the zinc oxide particle is one having larger particle diameter and showing smaller value of D90/D10 than conventional zinc oxide particles (that is, coarse particles having extremely-large particle diameter are small in amount). This zinc oxide particle is not publically known and is obtained by the inventors for the first time.

The median size is also referred to as D50. When powder is divided by particle diameter based on the median size into two groups, bigger group and smaller group have equal amounts. D10 and D90 correspond to the point where the cumulative weight from the small-particle-diameter side reaches 10% and 90% in the cumulative particle size distribution. D10, D50, and D90 are values determined by measuring the particle size distribution, respectively. The particle size distribution is measured by using laser diffraction/scattering particle size distribution analyzer (LS 13 320 type manufactured by Beckman Coulter) according to the present invention.

The lower limit of the median size is 1.0 μm and more preferably 1.5 μm. The upper limit of the median size is 30 μm and more preferably 20 μm.

The particle shape of the zinc oxide particle of the present disclosure is not particularly limited, but includes needle shape, bar-like shape, plate-like shape, spherical shape and the like. Preferably, the particle shape is nearly spherical shape. In addition, the particle shape can be observed by Scanning Electron Microscope (JSM-5400 manufactured by JEOL Ltd.).

In the zinc oxide particle of the present invention, the proportion of coarse particles having particle diameter of 50 μm or more is preferably not more than 0.05%. The proportion of coarse particles having particle diameter of 50 μm or more can be measured according to JIS K1410 zinc oxide/sifted residue test.

The zinc oxide particle of the present disclosure can be produced by baking a source of the zinc oxide particle in the presence of ammonium bromide. This method for producing the zinc oxide particle is one aspect of the present invention. The method for producing a zinc oxide particle is described in more detail below.

In the method for producing a zinc oxide particle of the present disclosure, a source of the zinc oxide particle was used as a raw material. The source of the zinc oxide particle is not particularly limited if it is converted to zinc oxide by baking and there may be mentioned zinc oxide, zinc chloride, zinc sulfate, zinc carbonate, zinc acetate and the like. Particularly, the source of the zinc oxide particle is preferably zinc oxide. The source of the zinc oxide particle preferably has an average particle diameter of 0.6 to 0.8 μm. The average particle diameter of the source of the zinc oxide particle is measured by the air permeability method.

The zinc oxide which is used as a raw material is not particularly limited, but the zinc oxide produced in compliance with the French Method, American Method and other common methods can be used. Particularly, zinc oxide which is produced in compliance with the French Method is preferably used because the zinc oxide has few impurities.

The method for producing a zinc oxide particle of the present disclosure is characterized by baking in the presence of ammonium bromide. In the production of inorganic particles, the baking in the presence of flux may be performed to increase particle diameter thereof. The inventors found that, when ammonium bromide is used as flux in this baking, the particle size distribution of the obtained zinc oxide particles became sharper than when other compounds were used as flux.

Ammonium bromide is added in the amount of 0.1 to 10 weight % relative to the source of the zinc oxide particle as a raw material. If the addition level is less than 0.1 weight %, energy costs increase because it becomes difficult for the source of the zinc oxide particle to grow.

If the addition level exceeds 10 weight %, productivity is poor because many coarse particles occur leading to a decreased yield ratio of desired products. As for the addition level of ammonium bromide, the lower limit is more preferably 0.2 weight % and the upper limit is more preferably 5 weight %

The zinc oxide particle of the present disclosure can be produced by mixing the source of the zinc oxide particle and ammonium bromide according to the common manner and baking the obtained mixture. The baking is preferably, for example, a static baking with use of a tunnel kiln or shuttle kiln, from an industrial viewpoint. By static baking, particles fuse with each other and particles growth proceeds effectively, and thus zinc oxide particles having large particle diameter can be obtained effectively.

The baking is performed at 600 to 1200° C. When the temperature is less than 600° C., it is not preferred because particle diameter may not increase sufficiently. When the temperature exceeds 1200° C., it is not preferred because many coarse particles occur and yield may be decreased.

The zinc oxide particles obtained by the above method have a sharp particle size distribution, but the zinc oxide particles may be pulverized or classified using a sieve if sharper particle size distribution is required or in order to remove a few coarse particles. The method of pulverizing is not particularly limited but includes the method using an atomizer for example. The classification using a sieve is not particularly restricted but includes wet classification and dry classification.

The zinc oxide particle of the present disclosure may be surface-treated according to need. The surface treatment method includes usual treatment methods in the technical field of inorganic particles. More specifically, there may be mentioned organic surface treatment using silane coupling agents or silicone oils and inorganic surface treatment using silica.

The use of the zinc oxide particle of the present disclosure is not particularly limited but the particles can be used as an exoergic filler, for example. This exoergic filler is one aspect of the present invention.

The exoergic filler of the present disclosure is usually used in the fields such as exoergic resin compositions, exoergic greases and exoergic coating compositions. Many publications concerning such applications are known, the exoergic filler of the present disclosure is used as such known applications as exoergic resin compositions, exoergic greases and exoergic coating compositions.

When used as an exoergic filler, rough zinc oxide particles having large particle diameter according to the present disclosure and fine zinc oxide particles having ⅓ to 1/40 of the particle diameter of the zinc oxide particle of the present disclosure may be used in combination. The mixing proportion of the rough particles and the fine particles is rough particles 90 to 40%: fine particles 10 to 60%, in volume. Preferably, the mixing proportion is rough particles 80 to 60%: fine particles 20 to 40%. When the mixing proportion of the rough particles and the fine particles is outside the above mentioned range, rough particles 90 to 40%: fine particles 10 to 60%, exoergic property may not be improved sufficiently.

When the zinc oxide particle of the present disclosure is used as an exoergic filler, the particle may be used in combination with other components. The other components which may be used together, include other exoergic fillers than zinc oxide such as metal oxides including magnesium oxide, titanium oxide and aluminum oxide, aluminum nitride, boron nitride, silicon carbide, silicon nitride, titanium nitride, metallic silicon, and diamond, resins and surfactants.

When the zinc oxide particle is used as exoergic filler, the particles can be used in the form of a resin composition obtained by mixing with a resin. Such resin composition is one aspect of the present invention. In this case, the resin may be a thermoplastic resin or a thermosetting resin and includes epoxy resins, phenol resins, polyphenylene sulfide resins (PPS), polyester resins, polyamides, polystyrenes, polyethylenes, polypropylenes, polyvinyl chloride, polyvinylidene chloride, fluorine resins, polymethyl methacrylate, ethylene/ethyl acrylate copolymer resin (EEA), polycarbonates, polyurethanes, polyacetals, polyphenylene ethers, polyether imides, acrylic nitrile-butadiene-styrene copolymer resin (ABS), liquid crystal resins (LCP), silicone resins, acrylic resins and other resins.

The resin composition of the present disclosure may be a resin composition for thermal molding obtained by kneading a thermoplastic resin and the zinc oxide particle in melting condition: a resin composition obtained by kneading a thermosetting resin and the zinc oxide particle following thermosetting: or other resin composition.

The addition amount of the zinc oxide particle in the resin composition of the present disclosure can be arbitrarily determined according to the intended performance of the resin composition such as thermal conductivity, hardness and so on. In order to express the exoergic property of the zinc oxide particle sufficiently, the addition amount of the particle is preferably 10 to 90 volume % relative to the total solid matter of the resin composition. The addition amount can be adjusted according to the needed level of exoergic property. For the application required better exoergic property, the addition amount is more preferably 30 volume % or more, and still more preferably 50 volume % or more.

In the resin composition of the present disclosure, the resin component may be selected in accordance to the use. For example, when the resin composition is placed between the heat source and the exoergic plate to make them stick together, resins having adhesion property and low hardness such as silicone resins and acrylic resins can be selected.

When the resin composition of the present disclosure is a resin composition for thermal molding, the resin composition may be produced by the method comprising melt-kneading a thermoplastic resin and the zinc oxide particle using a double-screw extruder, for example, to pelletize the resin composition and then, molding to the desired shape by the arbitrary molding method such as injection molding and so on.

When the resin composition of the present disclosure is the resin composition obtained by kneading a thermosetting resin and the zinc oxide particle following thermosetting, it is preferably molded by pressure forming. Such method for producing the resin composition is not particularly limited, but includes the method molding the resin composition by transfer molding.

The applications of the resin composition of the present disclosure include exoergic parts of electronic components, thermal-conductive bulking agents, insulating bulking agents for temperature measurement. For example, the resin composition of the present disclosure can be used in order to transfer the heat from the exothermic electronic components, such as MPU, power transistor, transformer to the exoergic components such as exoergic fins and exoergic fan, and can be placed between the exothermic electronic components and exoergic components. This will allow good heat transfer between the exothermic electronic components and the exoergic components and will provide for a decrease in malfunction of the exothermic electronic components for a long term. Furthermore, the resin composition of the present disclosure can be preferably used for connecting a heat pipe and a heat sink, or connecting a module incorporated into various exothermic bodies and a heat sink.

When the zinc oxide particle is used as an exoergic filler, the particle may be used as an exoergic grease obtained by mixing with a base oil which contains a mineral oil or a synthetic oil. This exoergic grease is one aspect of the present disclosure.

The addition amount of the zinc oxide particle in the exoergic grease of the present disclosure may be decided according to the intended degree of thermal conductivity. In order to express the exoergic property of the zinc oxide particle sufficiently, the addition amount of the particle is preferably 10 to 90 volume % relative to the total amount of the exoergic grease. The addition amount can be adjusted according to the needed level of exoergic property. For the application required better exoergic property, the addition amount is more preferably 30 volume % or more, and still more preferably 50 volume %.

As the base oil, one or more kinds of oil materials selected from the group consisting of mineral oils, synthesis oils, silicone oils, fluorinated hydrocarbon oils and the like can be used. The synthesis oil is preferably a hydrocarbon oil. As the synthesis oil, there may be mentioned α-olefins, diesters, polyol esters, trimellitic esters, polyphenyl ethers, alkylphenyl ethers and so on.

The exoergic grease of the present disclosure may contain a surfactant according to need. The surfactant is preferably a nonionic surfactant. By adding the nonionic surfactant, thermal conductivity can be improved and consistency of the exoergic grease can be controlled moderately.

As the nonionic surfactant, there may be mentioned polyoxyethylene alkyl ethers, polyoxyethylene alkyl phenyl ethers, polyoxyethylene alkyl naphthylene ethers, polyoxyethylene castor oil, polyoxyethylene hydrogenated castor oil, polyoxyethylene alkylamides, polyoxyethylene polyoxypropylene glycols, polyoxyethylene-polyoxypropylene glycol ethylene diamines, decaglycerin fatty acid esters, polyoxyethylene fatty acid monoesters, polyoxyethylene fatty acid diesters, polyoxyethylene propylene glycol fatty acid esters, polyoxyethylene sorbitan fatty acid monoesters, polyoxyethylene sorbitan fatty acid triesters, ethylene glycol fatty acid monoesters, diethylene glycol fatty acid monoesters, propylene glycol fatty acid monoesters, glycerin fatty acid monoesters, pentaerythritol fatty acid monoesters, sorbitan fatty acid monoesters, sorbitan fatty acid sesquiesters, and sorbitan fatty acid triesters.

The effect of adding the nonionic surfactant depends on the kind of the exoergic filler, addition amount, and HLB which is the term showing the balance between hydrophilicity and (hydrophile-lipophile balance). Liquid surfactants with HLB of not more than 9 are preferred because good consistency is obtained at room temperature, in the practice of the present disclosure. Anionic surfactants, cationic surfactants and ampholytic surfactants may be used in the application such as high exoergic grease where the decrease of electrical insulation and electrical resistance are not emphasized.

The exoergic grease of the present disclosure can be produced by mixing the above mentioned components using a mixing apparatus such as a dow mixer (kneader), gate mixer, planetary mixer and so on.

The exoergic grease of the present disclosure may be applied to the exothermic body or the exoergic body. As the exothermic body, there may be mentioned, for example, exothermic electric components such as general electrical source; power transistor for electrical source, power module, thermistor, thermo couple, temperature sensor and other electrical apparatus: integrated circuit element such as LSI and CPU. As the exoergic body, there may be mentioned, for example, exoergic components such as heat spreader, heat sink; heat pipe, and exoergic plate. The grease can be applied by the screen print method. The screen print method may be performed using metal mask or screen mesh. By applying the exoergic grease of the present disclosure between the exothermic body and the exoergic body, it is able to effectively remove heat from the exothermic body because heat transfer from the exothermic body to the exoergic body is performed efficiently.

When the zinc oxide particle of the present disclosure is used as an exoergic filler, the filler can be used as a coating composition obtained by dispersing the filler in a resin solution or dispersion liquid. This exoergic coating composition is one aspect of the present disclosure. In this case, the resin contained in the composition may be a hardenable one or a nonhardenable one. The resin may include the exemplified resins which can be used in the resin composition mentioned above. The coating composition may be a solvent type one containing organic solvents or an aqueous type one containing a resin dissolved or dispersed in water.

The method for producing the coating composition is not particularly restricted but the coating composition can be produced by mixing and dispersing the necessary materials and solvents using a disper or beads mill.

The addition amount of zinc oxide particle in the exoergic coating composition of the present disclosure may be decided according to the intended degree of thermal conductivity. In order to express the exoergic property of the zinc oxide particle sufficiently, the addition amount of the particle is preferably 10 to 90 volume % relative to the total amount of the coating composition. The addition amount can be adjusted according to the needed level of exoergic property. For the application required better exoergic property, the addition amount is more preferably 30 volume % or more, and still more preferably 50 volume %.

The zinc oxide particle of the present disclosure can be used in fields such as rubber accelerators, pigments for coating compositions and inks, such electronic components as ferrite and varistor, medicinal products and cosmetics in addition to the exoergic filler.

Hereinafter, the present disclosure will be described in more detail by way of examples, but the present disclosure is not limited to these examples.

Hereinafter, median size and particle size distribution of the obtained zinc oxide large particle were measured by laser diffraction/scattering particle size distribution analyzer (LS 13 320 type manufactured by Beckman Coulter). The observation of the particles was performed using Scanning Electron Microscope (JSM-5400 manufactured by JEOL Ltd.). Amounts of coarse particles were measured according to JIS K 1410 zinc oxide/sifted residue test.

EXAMPLE 1

ZINC OXIDE No. 1 (manufactured by Sakai Chemical Industry, average particle diameter 0.7 µm) 1200 g and 12 g of ammonium bromide were mixed for 30 seconds, and the obtained mixed powder was charged into quartz pot with inside dimension of 235 mm.times.160 mm.times.56 mmH followed by baking at 910 ° C. for 3 hours.

After cooling, the obtained mixed powder was dispersed into 3.5 liter of water and screened through 400 mesh (opening of screen 38 µm). The slurry passing through the mesh was filtered and dried to obtain a white powder. The particle size distribution was measured and it was found that the median size was 10.55 µm and D90/D10 was 3.71. Shifted residue at 45 µm was measured and found to be not more than 0.01%.

EXAMPLE 2

The white powder was obtained by following the same procedure as that of Example 1 except that the baking temperature was changed to 700° C. and the baking time was changed to 2 hours. The median size of the powder particle was 2.03 µm, D90/D10 was 4.00 and sifted residue at 45 µm was not more than 0.01%.

EXAMPLE 3

The white powder was obtained by following the same procedure as that of Example 1 except that the addition amount of ammonium bromide was changed to 60 g and the baking temperature was changed to 1100° C. The median size of the powder particle was 19.70 µm, D90/D10 was 3.41 and sifted residue at 45 µm was not more than 0.01%.

COMPARATIVE EXAMPLE 1

The white powder was obtained by following the same procedure as that of Example 1 except that ammonium bromide was changed to ammonium chloride and the baking temperature was changed to 750° C. The median size of the powder particle was 7.82 µm, D90/D10 was 12.33 and sifted residue at 45 µm was not more than 0.01%.

COMPARATIVE EXAMPLE 2

The white powder was obtained by following the same procedure as that of Example 1 except that ammonium bromide was replaced with sodium chloride and the baking temperature was changed to 900° C. The median size of the powder particle was 11.00 µm, D90/D10 was 6.85 and sifted residue at 45 µm was not more than 0.01%.

COMPARATIVE EXAMPLE 3

The white powder was obtained by following the same procedure as that of Example 1 except that ammonium bromide was replaced with potassium chloride and the baking temperature was changed to 930° C. The median size of the powder particle was 10.16 µm, D90/D10 was 6.45 and sifted residue at 45 µm was not more than 0.01%.

COMPARATIVE EXAMPLE 4

The white powder was obtained by following the same procedure as that of Example 1 except that ammonium bromide was replaced with potassium bromide and the baking temperature was changed to 900° C. The median size of the powder particle was 11.20 µm, D90/D10 was 5.79 and sifted residue at 45 µm was not more than 0.01%.

COMPARATIVE EXAMPLE 5

The white powder was obtained by following the same procedure as that of Example 1 except that ammonium bromide was replaced with magnesium chloride and the baking temperature was changed to 690° C. The median size of the powder particle was 7.58 µm, D90/D10 was 13.56 and sifted residue at 45 µm was not more than 0.01%.

COMPARATIVE EXAMPLE 6

The white powder was obtained by following the same procedure as that of Example 1 except that ammonium bromide was replaced with barium chloride and the baking temperature was changed to 950° C. The median size of the powder particle was 7.75 µm, D90/D10 was 6.30 and sifted residue at 45 µm was not more than 0.01%.

These results showed that zinc oxide particles having narrower particle size distribution can be obtained by using ammonium bromide as flux compared to other compounds.

EXAMPLES 4 to 6

Resin compositions were prepared by heat mixing EEA resin (Rexpearl A-1150 manufactured by Japan Polyethylene Corporation) and zinc oxide particles of Examples 1 and 2 at 160° C. as shown in Table 1 and then pressure molding. This resin composition was molded to be a molded article with 50 mmϕ×2 mm. Thermal conductivity of the molded articles were measured and results were shown in Table 1. In addition, thermal conductivity was measured at 25° C. according to the method with heat flow meter.

COMPARATIVE EXAMPLE 7

A molded article of EEA resin was obtained by following the same procedure as that of Examples 4 to 6 except that filler was not added. Thermal conductivity of the molded article was measured and the result was shown in Table 1.

COMPARATIVE EXAMPLES 8 to 10

Thermal conductivity was measured by following the same procedure as that of Examples 4 to 6 except that zinc oxide particles were changed to alumina. The results are shown In Table 1. In addition, the numeric values in Table mean the average particle diameter of alumina.

EXAMPLE 7

Epoxy resin (jER 828 manufactured by JAPAN EPOXY RESIN Co., Ltd), curing agent for epoxy resin (jER CURE ST 12 manufactured by JAPAN EPOXY RESIN Co., Ltd) and the zinc oxide particle of Example 1 were mixed as shown in Table 2, and the obtained mixture was injected into a die with 50 mmϕ×2 mm and heat treated to obtain a molded article at 80° C. for 3 hours. The thermal conductivity of the molded article was measured and the result was shown in Table 2.

COMPARATIVE EXAMPLE 11

Thermal conductivity measurement was done by following the same procedure as that of Example 7 except that the zinc oxide particle was changed to alumina 10 µm. The result is shown in Table 2.

TABLE 2

|  |  | Example 7 | Comparative Example 11 |
|---|---|---|---|
| Addition amount (weight part) | Epoxy resin | 12 | 12 |
|  | Curing agent for epoxy resin | 6 | 6 |
|  | Zinc oxide particle of Example 1 | 28 |  |
|  | Alumina 10 µm |  | 20 |
| Filler (volume %) |  | 25 | 25 |
| Thermal conductivity (W/m · K) |  | 0.5 | 0.3 |

EXAMPLE 8

Silicone resin (KE-103 manufactured by Shin-Etsu Chemical Co., Ltd), curing agent for silicone resin (CAT-103 manufactured by Shin-Etsu Chemical Co., Ltd) and the zinc oxide particle of Example 1 were mixed as shown in Table 2, and the obtained mixture was heat molded at 150° C. for 30 minutes to obtain a resin composition. Then, the resin composition was further molded to obtain a molded article with 50 mmϕ×2 mm. The thermal conductivity of the molded article was measured and the result was shown in Table 3.

COMPARATIVE EXAMPLE 12

Thermal conductivity measurement was done by following the same procedure as that of Example 8 except that the zinc oxide particle replaced with to alumina 10 µm. The result is shown in Table 3.

TABLE 1

|  |  | Comparative Example 7 | Example 4 | Example 5 | Examle 6 | Comparative Example 8 | Comparative Example 9 | Comparative Example 10 |
|---|---|---|---|---|---|---|---|---|
| Addition amount (weight part) | EEA resin | 100 | 10 | 12 | 10 | 12 | 12 | 10 |
|  | Zinc oxide particle of Example 1 |  | 100 |  | 70 |  |  |  |
|  | Zinc oxide particle of Example 2 |  |  | 100 | 30 |  |  |  |
|  | Alumina 20 µm |  |  |  |  | 68.5 |  |  |
|  | Alumina 10 µm |  |  |  |  |  | 68.5 | 51.4 |
|  | Alumina 0.8 µm |  |  |  |  |  |  | 17.1 |
| Filler (volume %) |  |  | 62.9 | 58.6 | 62.9 | 58.6 | 58.6 | 62.9 |
| Thermal conductivity (W/m · K) |  | 0.3 | 2.4 | 2.5 | 3.0 | 2.2 | 1.7 | 1.3 |

TABLE 3

|  |  | Example 8 | Comparative Example 12 |
|---|---|---|---|
| Addition amount (weight part) | Silicone resin | 14 | 14 |
|  | Curing agent for silicone resin | 0.7 | 0.7 |
|  | Zinc oxide particle of Example 1 | 84 |  |
|  | Alumina 10 μm |  | 60 |
| Filler (volume %) |  | 50 | 50 |
| Thermal conductivity (W/m · K) |  | 2.0 | 1.4 |

EXAMPLE 9

Silicone oil (KF-99 manufactured by Shin-Etsu Chemical Co., Ltd) and the zinc oxide particle of Example 1 were mixed as shown in Table 4 to obtain an exoergic grease. The thermal conductivity of the exoergic grease was measured and the result is shown in Table 4.

COMPARATIVE EXAMPLE 13

Thermal conductivity measurement was done by following the same procedure as that of Example 9 except that the zinc oxide particle was replaced with alumina 10 μm. The result is shown in Table 4.

TABLE 4

|  |  | Example 9 | Comparative Example 13 |
|---|---|---|---|
| Addition amount (weight part) | Silicone oil | 5 | 5 |
|  | Zinc oxide particle of Example 1 | 28 |  |
|  | Alumina 10 μm |  | 20 |
| Filler (volume %) |  | 50 | 50 |
| Thermal conductivity (W/m · K) |  | 1.7 | 1.2 |

EXAMPLE 10

As shown in Table 5, epoxy resin (jER 828 manufactured by JAPAN EPOXY RESIN Co., Ltd), toluene and the zinc oxide particle of Example 1 were dispersed by disper to obtain an exoergic coating composition. The thermal conductivity of the exoergic coating composition was measured and the result is shown in Table 5.

COMPARATIVE EXAMPLE 14

Thermal conductivity measurement was done by following the same procedure as that of Example 10 except that the zinc oxide particle was replaced with alumina 10 μm. The result is shown in Table 5.

TABLE 5

|  |  | Example 10 | Comparative Example 14 |
|---|---|---|---|
| Addition amount (weight part) | Epoxy resin | 6.3 | 6.3 |
|  | Toluene | 11.7 | 11.7 |
|  | Zinc oxide particle of Example 1 | 56 |  |
|  | Alumina 10 μm |  | 40 |
| Filler (volume %) (relative to the total amount of the coating composition) |  | 35 | 35 |
| Thermal conductivity (W/m · K) |  | 1.3 | 0.9 |

Judging from the results shown in Tables 1 to 5, it is apparent that the exoergic filler of the present disclosure has superior performances to the exoergic fillers which are widely used and are outside the scope of the present disclosure. It is apparent that the exoergic filler of the present disclosure is able to provide the exoergic property on any of resin compositions of Examples, no matter how great or small of addition amount of the exoergic filler.

INDUSTRIAL APPLICABILITY

The zinc oxide particle of the present disclosure is used suitably as the exoergic filler. In addition, the particle can be used for applications such as rubber accelerators, pigments for coating compositions and inks, such electronic components as ferrite and varistor, medicinal products and cosmetics.

The invention claimed is:

1. A method for producing a zinc oxide particle, comprising baking a source of the zinc oxide particle in the presence of ammonium bromide to obtain a zinc oxide particle having a median size of 1 to 30 μm and D90/D10 of 4 or less.

2. The method for producing a zinc oxide particle according to claim 1, wherein the proportion of particles having a particle diameter of 50 μm or more is not more than 0.05% as measured according to the JIS K1410 zinc oxide/sifted residue test.

3. The method for producing a zinc oxide particle according to claim 1, wherein ammonium bromide is added in the proportion of 0.1 to 10 weight % relative to the source of the zinc oxide particle and the baking is performed by static baking at 600 to 1200° C.

4. The method for producing a zinc oxide particle according to claim 3, wherein the proportion of particles having a particle diameter of 50 μm or more is not more than 0.05% as measured according to the JIS K1410 zinc oxide/sifted residue test.

5. The method for producing a zinc oxide particle according to claim 3, wherein the source of the zinc oxide particle is zinc oxide.

6. The method for producing a zinc oxide particle according to claim 5, the zinc oxide as the source of the zinc oxide particle has an average particle diameter of 0.6 to 0.8 μm.

7. The method for producing a zinc oxide particle according to claim 1, wherein the source of the zinc oxide particle is zinc oxide.

8. The method for producing a zinc oxide particle according to claim 7, the zinc oxide as the source of the zinc oxide particle has an average particle diameter of 0.6 to 0.8 μm.

9. The method for producing a zinc oxide particle according to claim 8, wherein the proportion of particles having a particle diameter of 50 μm or more is not more than 0.05% as measured according to the JIS K1410 zinc oxide/sifted residue test.

10. The method for producing a zinc oxide particle according to claim 7, wherein the proportion of particles having a particle diameter of 50 μm or more is not more than 0.05% as measured according to the JIS K1410 zinc oxide/sifted residue test.

* * * * *